June 2, 1936.　　　H. GALLUSSER　　　2,043,040
DOUBLE POWER BRAKING DEVICE, PARTICULARLY FOR RAILWAY VEHICLES
Filed Nov. 23, 1934
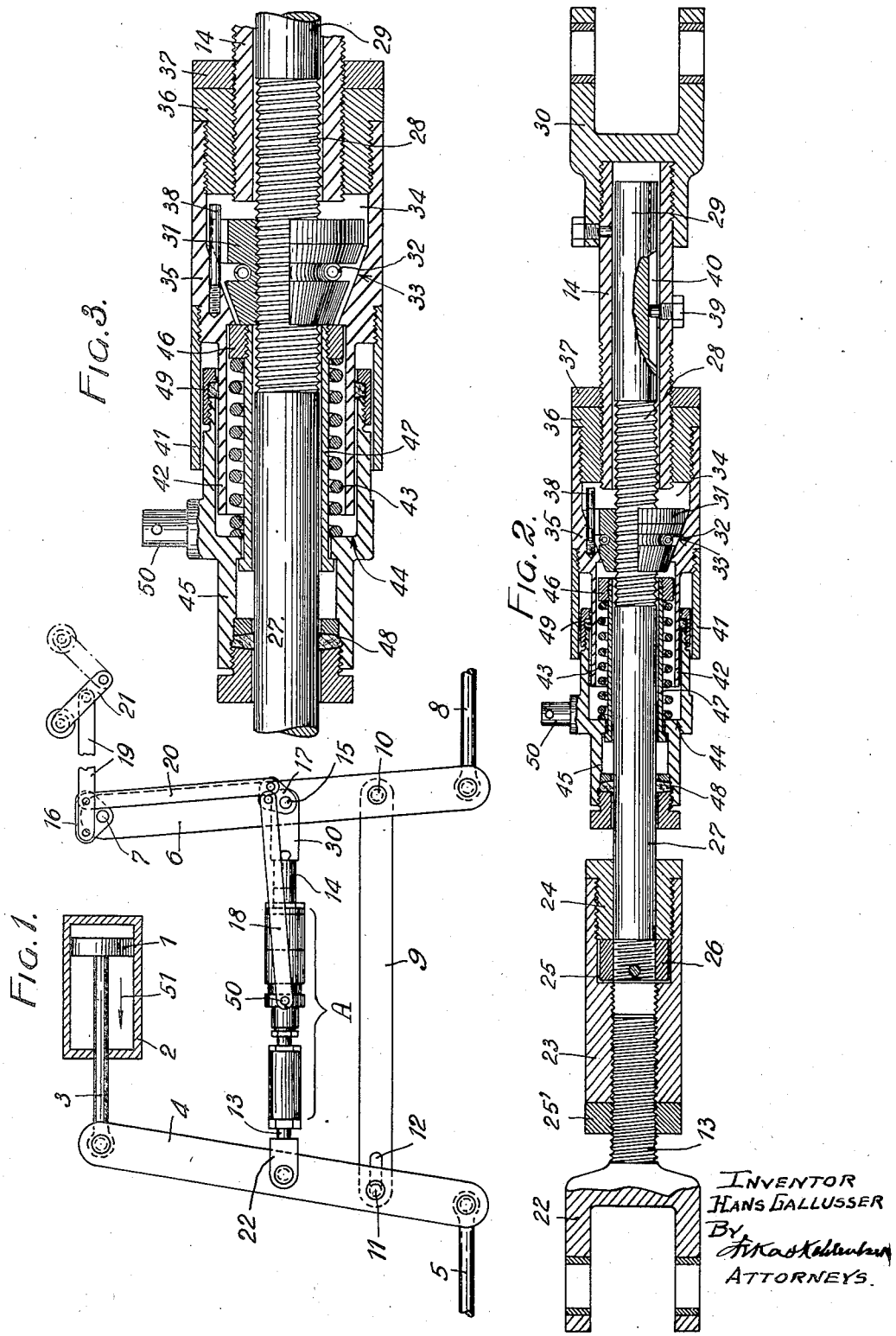
INVENTOR
HANS GALLUSSER
BY
ATTORNEYS.

Patented June 2, 1936

2,043,040

UNITED STATES PATENT OFFICE 2,043,040

DOUBLE POWER BRAKING DEVICE, PARTICULARLY FOR RAILWAY VEHICLES

Hans Gallusser, Geneva, Switzerland

Application November 23, 1934, Serial No. 754,429

5 Claims. (Cl. 188—195)

In railway vehicles and more particularly in vehicles intended for the transport of goods, it is necessary to obtain two different braking powers. One of said braking powers corresponds to the braking of the loaded vehicle and is called charge braking, whilst the other braking power is intended for the braking of the empty vehicle, and this is the reason why it is generally called tare braking. As may be easily inferred, tare braking is less powerful than charge braking, the latter however is too powerful to brake the empty vehicle which would under the action of such a braking action begin to skid.

Different devices have already been proposed for obtaining the two aforesaid braking powers, they are generally complicated and necessitate even in certain cases the utilization of two braking cylinders, but two such braking cylinders are not required in the present invention.

In the device embodying the invention, the piston rod of the braking piston acts in the well known manner on one of the two levers, the other lever has a fixed point, said two levers being interconnected by means of a bar and the free ends of said levers being further connected to the brake rigging.

In the embodiment of the invention, a supplementary bar is provided between the levers, said bar however is divided into two pieces which are interconnected by means of connecting members (description and detail of said connecting members will be given hereinafter) and moreover the opening of the customary bar intended for one of the lever pivots is extended and the reason for this extension will be given hereinafter.

In the drawing which shows an embodiment of the present invention, Fig. 1 is a view of the assembled parts of the device located between the levers; Fig. 2 illustrates a longitudinal section of the supplementary bar divided into two pieces, with its coupling members, and Fig. 3 is a fragmentary longitudinal section, on an enlarged scale, showing said bar in another position of said members.

According to the illustrated example shown in Fig. 1, the piston 1 which is located in the cylinder 2, acts by means of its rod 3 on the lever 4, the free end of said lever being connected to the brake rigging 5. Another similar lever 6, which is adapted to swing around a fixed point 7, is also connected at its free end to the brake rigging 8. Both levers are interconnected by means of two members:

Firstly by means of a rigid bar 9 which is pivoted at 10 on the lever 6 and at 11 on the lever 4, said latter pivoting point being however so adapted as to permit the pivot 11 to move longitudinally and to a certain extent relative to the bar 9, which is for this purpose provided with an extended opening or slot 12.

Secondly, by means of a second extensible bar located nearer the cylinder 1 and the fixed point 7 than the first bar, said second bar consisting chiefly of two sections 13, 14 interconnected by means of an apparatus or coupling A to be hereinafter described.

The pivoting point 7 on the lever 6 and the pivoting point 15 of the section 14 on said lever alike serves as fixation points and as centres of rotation for two members 16, 17, which are intended to transmit to a rod or link 18 and by means of rods or links 19 and 20, the movements of a control lever 21 which can occupy two positions, indicated respectively in full lines and in dot and dash lines in Fig. 1.

The position illustrated in full lines corresponds, as will be seen hereinafter, to tare braking and the position in dot and dash lines, on the other hand, to charge braking.

The connecting members of the sections 13 and 14, which connecting members are illustrated in Fig. 2, are constructed in the following manner described from left to right in the drawing.

The section 13 comprises a fork 22 for its attachment to the lever 4, said fork being terminated in a threaded part upon which a screw coupling box consisting of two parts 23, 24, and a safety nut 25 is screwed. Between the two parts 23, 24 of the screw coupling box is provided a chamber 25 into which penetrates a head 26 screwed and secured on a rod 27, an arrangement which permits the screw coupling box 23, 24 to be screwed and unscrewed on the threaded part of the section 13 without requiring the rod 27 to rotate.

The rod 27 comprises a threaded part 28 with special saw-tooth formed threads, and a cylindrical part 29 projecting into the section 14 which is integral with a second fork 30 for attaching the section 14 to the lever 6 by means of the pivot 15.

On the rod 27 and at the point of its threaded part 28 is located a nut 31 formed in several parts which are held together by means of a spring ring 32 and constituting an elastic clamp, said nut or clamp being exteriorly conically shaped and bearing normally on the conical seating member 33 which partly delimits the chamber 34. Said chamber is divided into two cylindrical members 35, 36, and inside the second of said cylindrical members is screwed the section 14 which is moreover held in place by means of the lock nut 37. The two cylindrical members 35, 36, are screwed into each other and the first of said cylindrical members further carries an interior pin 38 intended to prevent any rotation of the nut 31.

The rod 27 and the section 14 are adapted to move axially and relatively to each other, but any relative rotative movement is rendered impossible by means of the screw 39 which is carried by the section 14 and projects into the groove 40 extending lengthwise of the cylindrical part 29 of the rod 27.

In addition to being provided with a protecting sleeve 41 which is screwed on the member 35, said member extends inside the device in the form of a tube 42 containing a spring 43 which, on the one hand, bears against a seating member 44 of a member 45 adapted to move axially over the rod 27 and, on the other hand, bears against the head 46 of a sleeve 47 also adapted to move axially over the rod 27.

In order to protect the connecting device described against the entrance of dirt and other impurities, it includes washers 48 and 49 the disposition of which is illustrated in the drawing.

Figs. 2 and 3 illustrate two different positions of the members hereinbefore described.

In Fig. 2, the head 46 of the sleeve does not come into contact with the nut or clamp 31 and thus permits said nut to bear freely on its seating member, or in other words forces said nut 31 into toothed engagement with the threads of the part 28 of the rod 27 when the latter is subjected to a pulling force; this fact renders any extension of the distance between the forks 22 and 30 impossible, whilst a shortening of said distance is possible. In fact, if a tractive effort is exerted on the sections 13, 14, the nut 31 bearing on its seating member 33 blocks the rod 27 and prevents said rod from moving relatively to the chamber 34, whilst an action in the other direction, tending to move the forks 22 and 30 nearer to each other, moves the nut 31 from the conical seating member 33, and pushes said nut against the section 14, a position in which the parts forming said nut can move away from each other and permit the rod 27 to pass. In that case, the parts of the nut slide over from thread to thread on the threading 28.

In Fig. 3 due to an axial displacement of the seating member 44 of the spring 43, said spring elastically forces the head 46 of the sleeve 47 against the free end of the conical seating member 33 in such a manner that the nut or clamp 31 can no longer bear against said seating member 33, the latter being held at a slight distance from said seating member. In these conditions, it will be seen that not only can the rod 27 slide axially through the nut 31 in the manner set forth above, but that the forks 22, 30, may also move away from each other, because the nut 31 can no longer effect the blocking of said rod 27 by cooperating with the seating member 33.

In short, in the position illustrated in Fig. 2, the bar consisting of sections 13, 14 and all the intermediary members cannot extend, but only shorten, whilst in the position illustrated in Fig. 3, said bar can both extend and shorten. As will be seen, said difference is realized simply by altering the position of the member 45, an alteration which is effected by acting from the exterior on said member, and by means of the pivot 50 which is illustrated in all three figures and to which pivot is fastened the free end of the bar 18.

As will be further noted, the position illustrated in Fig. 2 corresponds to the position in full lines of the lever 21 illustrated in Fig. 1, whilst the position illustrated in Fig. 3 corresponds to the position shown in Fig. 1 in dot and dash lines of said lever.

And now here is the description of what happens when the brakes are applied, i. e. when the piston 1 exerts an effort in the direction of the arrow 51 in Fig. 1.

Assuming all the members to be in the position in full lines of the lever 21 and in the position as illustrated in Fig. 2, it will be seen that the aforesaid movement of the piston seeks to move the forks 22 and 30 away from each other, as well as the pivots 10 and 11, this result of the aforesaid movement of the piston being due to the fact that the members of the brake rigging 5 and 8 resist any movement tending to move said members away from each other.

There is produced accordingly a tractive effort on the sections 13 and 14, but an extension of the bar consisting of said two sections 13 and 14 is impossible due to the fact that the nut 31 bears immediately on its seating member 33, and thus connects the sections 13 and 14 in one rigid whole.

The levers 4 and 6 then oscillate around the pivots of the forks 22 and 30, a movement which is rendered possible due to the extended opening 12 of the bar 9, which consequently does not offer any resistance to the moving together of the lower ends of the levers 4 and 6. The braking action under such conditions is effected with a ratio of transmission 1:1, if it is assumed that the forks 22 and 30 are connected with the levers 4 and 6 at approximately the middle of the active length of said levers 4 and 6.

The braking action, obtained in the conditions set forth above, accordingly corresponds to an effort on the brake rigging, an effort approximately equal to the effort furnished by the piston 1; said braking action is that utilized for tare braking.

If, on the other hand, the lever 21 is moved to the position illustrated by the dot and dash lines in Fig. 1 the bar 19 will be moved to the right in the drawing, and both the parts 16 and 17 will be turned clockwise, with the result that the bar 18 exerts a tractive effort towards the right in the drawing, on the pivot 50 at this stage: the different members accordingly occupy the position illustrated in Fig. 3.

In said position, the movement of the piston 1 in the direction of the arrow 51 forces the levers 4 and 6 to oscillate around the bar 9, because the sections 13 and 14 being no longer integral with each other, the bar which said sections together constitute, extends to the necessary extent, on the operation of the braking action.

If reference be made to the drawing, it will be seen that under these conditions, the ratio of transmission between the force exerted by the piston 1 and the effort received by the parts of the brake rigging 5 and 8 is approximately 3:1, thus providing the possibility of a braking action three times more effective, that is to say corresponding to a charge braking of the vehicle.

Due to the manner in which the device is arranged, it is not absolutely necessary to release the brake in order to pass from the tare braking position to the charge braking position and vice versa.

Now this is what happens in said case.

If, when the brake is applied, the position of the lever 21 corresponding to the position of the members in Fig. 2, is changed to the position of said members in Fig. 3, it will be seen that the nut 31, which is firmly applied against its seating member 33, cannot move away from said seating member, because of the fact that the brake is applied. In passing from the position shown in Fig. 2 to that illustrated in Fig. 3, the member 45 is axially shifted and thus displaces the spring 43. The latter in turn correspondingly displaces the sleeve 47, it being understood that the member 45, the spring 43, and the sleeve 47 during these operations all move towards the right in the drawing. At a given time the head 46 of the sleeve 47 engages the nut 31 which however is held against movement because the brake is applied; the movement of the sleeve 47 towards the right is accordingly arrested. As the displacement of the member 45 towards the right, however, continues beyond the point at which the sleeve 47 is stopped, the spring 43 will be compressed. Finally as soon as the brake is released, the nut 31 is free from restraint so that the spring 43 expands and shifts the sleeve 47 and its head 46 further towards the right and thereby moves the nut 31 away from the seating member 33; at this stage the parts are therefore in the position shown in Fig. 3.

If, on the other hand, when the brake is applied, the position of the lever 21, which corresponds to the position of the members illustrated in Fig. 3, is changed to the position of said members in Fig. 2, it will be seen that, as the application of the brake occurs at that moment by means of the bar 9, the different parts of the device A do not function. The operation which is effected thus consists simply in moving the head 46 away from the seating member 33 and after the release of the brake, nothing else prevents the nut 31 from cooperating normally with its seating member 33. In other words the rod 27 is free to slide axially through the nut 31, and the forks 22 and 30 are free to move away from each other; this is due to the fact that at this stage the nut 31 does not develop a clamping action on the threading 28 of the rod 27.

What has been set forth above simply shows, that if one passes from one of the positions of the lever 21 to the other position of said lever, when the brake is applied, the desired alteration becomes effective only after the brake has been released, and only upon the next application of the brake.

It is moreover well known that in brakes conceived in the manner illustrated in Fig. 1, it is preferable that the final blocking of the brake should occur in a position approximately parallel of the two levers 4 and 6. Now, as their centre of rotation varies according as to which of the two bars is active, it will be seen that the aforesaid condition is only realizable if, at the moment of tare braking, i. e. by means of the device A, said device extends to a certain degree before the brake blocks are applied.

This is the reason why the nut 31 is adapted to move loosely between its conical seating member 33 and the abutment constituted by the section 14. Said slack of the nut 31 permits of a certain idle running between the abutment and the seating member, i. e. a certain extension of the whole device A, before the nut 31 meets its seating member and is in a position to block or connect.

As will be seen, the fact that the section 14 is screwed into the part 36 permits of adjusting at will the extent of the slack of the nut 31, so as to obtain a tare braking in the most effective position of the levers 4 and 6.

The other method of adjusting set forth at the beginning of this description, i. e. the possibility of extending or shortening the whole device by turning the screw coupling box 23, 24, permits, in the position when the brake is applied, of adjusting the pivot 11 to bear well against the left end (in the drawing) of the extended opening 12. This method of adjusting is all the more necessary as in the construction of railway vehicles the parts are constructed rather approximately, so that an apparatus constructed for one particular vehicle cannot be mounted without having been previously adjusted on another vehicle even if belonging to the same series.

Both the pin 38 and the screw 39 oppose a possible rotation of the nut 31 or of the rod 27, this opposition being necessary in order to avoid any disarrangement of the mechanism likely to ensue from such a rotation.

What I claim is:

1. A device adapted to develop two braking powers particularly in railway vehicles, comprising a first lever, a piston arranged to act on one end of said lever, a second lever having its corresponding one end pivotally fixed, the opposite ends of said levers being connected with the brake rigging, a rigid bar pivotally connected with one of said levers at an intermediate point, a pivot and slot connection between said bar and the other lever at a corresponding intermediate point, an extensible connection pivotally connected with said levers at points between said rigid bar and the first mentioned ends of said levers, said extensible connection consisting of relatively movable portions one of which is provided with a toothed member, an elastic clamp, seating means on the other portion of said extensible connection adapted to cooperate with said clamp and adjust it into clamping engagement with said toothed member to prevent extension of said extensible connection, controlling means adjustable to inoperative and operative relation to said clamp for respectively permitting and preventing co-operation of said seating means with said clamp, and means for selectively adjusting said controlling means to said inoperative and operative relation to said clamp to thereby cause said extensible connection or said rigid bar, independently of each other, to respectively develop brake applying forces of different strength in said levers.

2. A device adapted to develop two braking powers particularly in railway vehicles, comprising a first lever, a piston arranged to act on one end of said lever, a second lever having its corresponding one end pivotally fixed, the opposite ends of said levers being connected with the brake rigging, a rigid bar pivotally connected with one of said levers at an intermediate point, a pivot and slot connection between said bar and the other lever at a corresponding intermediate point, an extensible connection pivotally connected with said levers at points between said rigid bar and the first mentioned ends of said levers, said extensible connection consisting of two sections, a rod adjustably connected with one of said sections and provided with a threaded part, an elastic clamp, a conical seating member connected with the other section adapted to co-operate with said clamp and adjust it into clamping engagement with the threaded part of said rod to prevent extension of said extensible connection, controlling means carried by said connection and adjustable into inoperative and operative relation to said clamp for respectively permitting and preventing co-operation of said conical seating member with said clamp, and means for selectively adjusting said controlling means to said inoperative and operative relation to said clamp to thereby cause said extensible connection or said rigid bar, independently of each other, to respectively develop brake applying forces of different strength in said levers.

3. A device adapted to develop two braking powers particularly in railway vehicles, comprising a first lever, a piston arranged to act on one end of said lever, a second lever having its corresponding one end pivotally fixed, the opposite ends of said levers being connected with the brake rigging, a rigid bar pivotally connected with one of said levers at an intermediate point, a pivot and slot connection between said bar and the other lever at a corresponding intermediate point, an extensible connection pivotally connected with said levers at points between said rigid bar and the first mentioned ends of said levers, said extensible connection consisting of two sections, a rod adjustably connected with one of said sections and provided with a threaded part, an elastic clamp, a conical seating member connected with the other section adapted to co-operate with said clamp and adjust it into clamping engagement with the threaded part of said rod to prevent extension of said extensible connection, controlling means carried by said connection and adjustable into inoperative and operative relation to said clamp for respectively permitting and preventing co-operation of said conical seating member with said clamp, linkage pivotally connected with said controlling means, and a control lever for actuating said linkage to selectively adjust said controlling means to said inoperative and operative relation to said clamp to thereby cause said extensible connection or said rigid bar, independently of each other, to respectively develop brake applying forces of different strength in said levers.

4. A device adapted to develop two braking powers particularly in railway vehicles, comprising a first lever, a piston arranged to act on one end of said lever, a second lever having its corresponding one end pivotally fixed, the opposite ends of said levers being connected with the brake rigging, a rigid bar pivotally connected with one of said levers at an intermediate point, a pivot and slot connection between said bar and the other lever at a corresponding intermediate point, an extensible connection pivotally connected with said levers at points between said rigid bar and the first mentioned ends of said levers, said extensible connection consisting of two sections, a rod provided with a threaded part, means for preventing said rod from rotating relatively about its axis, a screw coupling box adjustably connecting said rod with one of said sections, an elastic conical clamp, a conical seating member connected with the other section adapted to co-operate with said clamp and adjust it into clamping engagement with the threaded part of said rod to prevent extension of said extensible connection, controlling means carried by said connection and adjustable into inoperative and operative relation to said clamp for respectively permitting and preventing co-operation of said conical seating member with said conical clamp, a plurality of links pivotally connected with each other and with said controlling means, and a control member pivotally connected with said links for actuating the same to selectively adjust said controlling means to said inoperative and operative relation to said clamp to thereby cause said extensible connection or said rigid rod, independently of each other, to respectively develop brake applying forces of different strength in said levers.

5. A device adapted to develop two braking powers particularly in railway vehicles, comprising a first lever, a piston arranged to act on one end of said lever, a second lever having its corresponding one end pivotally fixed, the opposite ends of said levers being connected with the brake rigging, a rigid bar pivotally connected with one of said levers at an intermediate point, a pivot and slot connection between said bar and the other lever at a corresponding intermediate point, an extensible connection pivotally connected with said levers at points between said rigid bar and the first mentioned ends of said levers, said extensible connection consisting of two sections, a rod provided with a threaded part, means for preventing said rod from rotating relatively about its axis, a screw coupling box adjustably connecting said rod with one of said sections, an elastic conical clamp, a conical seating member connected with the other section adapted to co-operate with said clamp and adjust it into clamping engagement with the threaded part of said rod to prevent extension of said extensible connection, controlling means carried by said connection and adjustable into inoperative and operative relation to said clamp for respectively permitting and preventing co-operation of said conical seating member with said conical clamp, a first operating member pivotally mounted on the pivotal connection between the extensible connection and said second lever, a second operating member pivotally mounted on the fixed pivot of said second lever, a link pivotally connected with said first operating member and said controlling means, a second link pivotally connected with each of said operating members, a third link pivotally connected with said second operating member, and a control member pivotally connected with said third link for actuating all of said links and operating members to selectively adjust said controlling means to said inoperative and operative relation to said clamp to thereby cause said extensible connection or said rigid rod, independently of each other, to respectively develop brake applying forces of different strength in said levers.

HANS GALLUSSER.